US011917722B2

(12) United States Patent
Kawaura

(10) Patent No.: US 11,917,722 B2
(45) Date of Patent: Feb. 27, 2024

(54) COMMUNICATION APPARATUS AND COMMUNICATION CONTROL METHOD

(71) Applicant: CANON KABUSHIKI KAISHA, Tokyo (JP)

(72) Inventor: Toshinori Kawaura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/329,840

(22) Filed: May 25, 2021

(65) Prior Publication Data

US 2021/0377724 A1 Dec. 2, 2021

(30) Foreign Application Priority Data

May 29, 2020 (JP) .................. 2020-094904

(51) Int. Cl.
*H04W 8/30* (2009.01)
*H04W 76/11* (2018.01)
*H04W 76/30* (2018.01)
*H04W 92/10* (2009.01)

(52) U.S. Cl.
CPC .............. *H04W 8/30* (2013.01); *H04W 76/11* (2018.02); *H04W 76/30* (2018.02); *H04W 92/10* (2013.01)

(58) Field of Classification Search
CPC ....... H04W 8/30; H04W 76/30; H04W 76/11; H04W 92/10; H04W 48/18; H04W 84/12; H04W 8/005
See application file for complete search history.

(56) References Cited

U.S. PATENT DOCUMENTS

| | | | |
|---|---|---|---|
| 2008/0310419 A1* | 12/2008 | Bansal ................. | H04L 45/124 370/395.6 |
| 2018/0262533 A1* | 9/2018 | McCaig ............. | H04L 63/1441 |
| 2020/0228496 A1* | 7/2020 | Mori .................... | H04L 69/323 |
| 2021/0211404 A1* | 7/2021 | Pandey ................ | H04L 45/028 |

FOREIGN PATENT DOCUMENTS

JP 5950699 B2 7/2016

* cited by examiner

*Primary Examiner* — Mandish K Randhawa
(74) *Attorney, Agent, or Firm* — Canon U.S.A., Inc. IP Division

(57) ABSTRACT

There is provided a communication apparatus that includes: a plurality of wireless interfaces; a storage unit configured to store, for a past established connection, connection history information associating a network identifier with an interface identifier of one of the plurality of wireless interfaces; and a communication control unit configured to select, based on the connection history information, one of the plurality of wireless interfaces, and transmit a connection request to another apparatus using the selected wireless interface.

10 Claims, 8 Drawing Sheets

FIG. 4A

DHCP TABLE OF AP100

| No | MAC Address | IP Address |
|---|---|---|
| 1 | 82:34::dw:12:14 | 192.168.0.1 |
| 2 | 7a:25::e1:12:34 | 192.168.0.2 |
| 3 | — | — |

FIG. 4B

DHCP TABLE OF AP 270

| No | MAC Address | IP Address |
|---|---|---|
| 1 | 82:34::dw:12:14 | 172.16.0.1 |
| 2 | — | — |
| 3 | — | — |

FIG. 4C

WIRELESS PROFILE TABLE OF PERSONAL COMPUTER

| No | SSID | PASSWORD |
|---|---|---|
| 1 | WIFIROUTER2G | 1234-abcd |
| 2 | — | — |
| 3 | — | — |

FIG. 4D

WIRELESS PROFILE TABLE OF PERSONAL COMPUTER

| No | SSID | PASSWORD |
|---|---|---|
| 1 | PRINTER2G | (OPEN) |
| 2 | WIFIROUTER2G | 1234-abcd |
| 3 | — | — |

FIG. 4E

NWIF SETTING TABLE OF PERSONAL COMPUTER

| index | MAC Address | IP address |
|---|---|---|
| 1 | 82:34::dw:12:14 | 172.16.0.1 |
| 2 | 8a:d3::d2:56:78 | — |
| 3 | — | — |

FIG. 4F

NWIF SETTING TABLE OF PERSONAL COMPUTER

| index | MAC Address | IP address |
|---|---|---|
| 1 | 8a:d3::d2:56:78 | — |
| 2 | 82:34::dw:12:14 | 172.16.0.1 |
| 3 | — | — |

FIG. 4G

CONNECTION HISTORY TABLE OF PERSONAL COMPUTER

| No | SSID | MAC Address | Lease end |
|---|---|---|---|
| 1 | WIFIROUTER2G | 82:34::dw:12:14 | 20xx.5.10 10:30:56 |
| 2 | PRINTER2G | 82:34::dw:12:14 | 20xx.5.8 17:45:07 |
| 3 | — | — | — |

FIG. 4H

NWIF MOUNTING HISTORY TABLE OF PERSONAL COMPUTER

| No | MAC Address |
|---|---|
| 1 | 82:34::dw:12:14 |
| 2 | 8a:d3::d2:56:78 |
| 3 | — |

COMMUNICATION APPARATUS AND COMMUNICATION CONTROL METHOD

BACKGROUND

Field

The present disclosure relates to a communication apparatus for wirelessly communicating with a communication device, and a communication control method.

Description of the Related Art

Conventionally, there exists a communication apparatus (for example, a personal computer) having a plurality of network interfaces (to be referred to as NW IFs hereinafter). If an IP address assigned to an NW IF is the same as that assigned to another NW IF of the same personal computer, the personal computer cannot normally perform network communication. To address this issue, there exists a technique of detecting duplication assignment of an IP address and generating an IP address again (see Japanese Patent No. 5950699).

SUMMARY

Various embodiments of the present disclosure eliminate the above-mentioned issue with conventional technology.

Various embodiments allow a communication apparatus to establish connections normally even in a case where duplication assignment of an IP address occurs.

According to various embodiments of the present disclosure, there is provided a communication apparatus including: a plurality of wireless interfaces; a storage unit configured to store, for a past established connection, connection history information associating a network identifier with an interface identifier of one of the plurality of wireless interfaces; and a communication control unit configured to select, based on the connection history information, one of the plurality of wireless interfaces, and transmit a connection request to another apparatus using the selected wireless interface.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate example embodiments of the present disclosure and, together with the description, serve to explain the principles of the disclosure.

FIG. 4A is a view showing a DHCP table of an AP according to one embodiment;

FIG. 4B is a view showing a DHCP table of an AP according to one embodiment;

FIG. 4C is a view showing a wireless profile table of the personal computer according to one embodiment;

FIG. 4D is a view showing a wireless profile table of the personal computer according to one embodiment;

FIGS. 4E and 4F are views each showing an NW IF setting table provided in the personal computer according to one embodiment;

FIG. 4G is a view showing a connection history table of the personal computer according to one embodiment;

FIG. 4H is a view showing an IF mounting history table of the personal computer according to one embodiment;

DESCRIPTION OF THE EMBODIMENTS

Figure 1A:
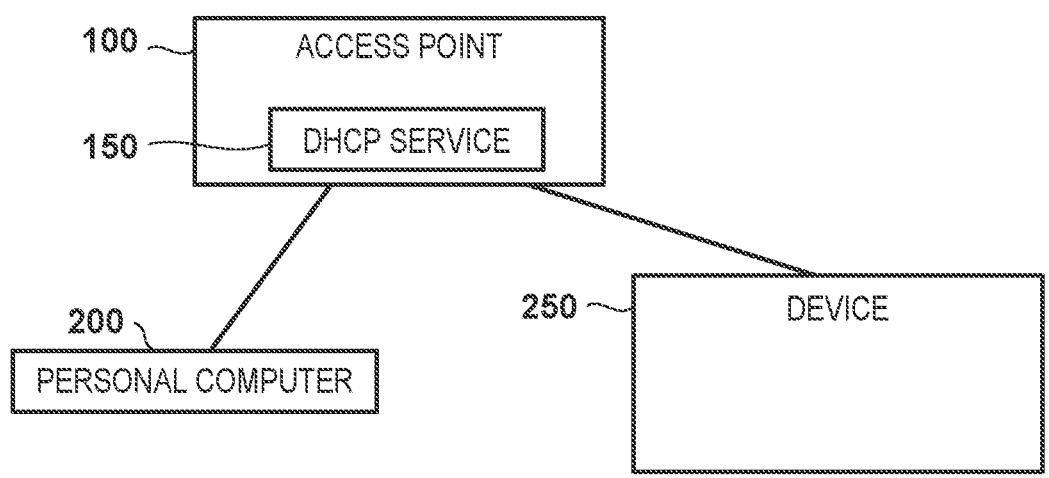
FIGS. 1A and 1B are views for explaining a system configuration according to one embodiment.

Hereinafter, example embodiments will be described in detail with reference to the attached drawings. Note, the following example embodiments are not intended to limit the scope of the claimed invention. Multiple features are described in the example embodiments, but the invention is not limited to embodiments that require all such features, and multiple such features may be combined as appropriate in an embodiment. Furthermore, in the attached drawings, the same reference numerals are given to the same or similar configurations, and redundant description thereof is omitted.

If a new IP address is acquired again after detecting duplication of an IP address, it may take time to start communication normally. Furthermore, considering a case in which a DHCP (Dynamic Host Configuration Protocol) function of dynamically assigning an IP address is reset, even if a connection request is made to the same connection destination, an IP address may be readily assigned in a duplication manner. As a result of occurrence of duplication assignment of an IP address, a connection can fail and it may take time to start communication after performing connection processing again. To address this situation, an example embodiment for performing connection normally even if duplication assignment of an IP address occurs will be described below.

First Embodiment (System Configuration)

Figure 1B:
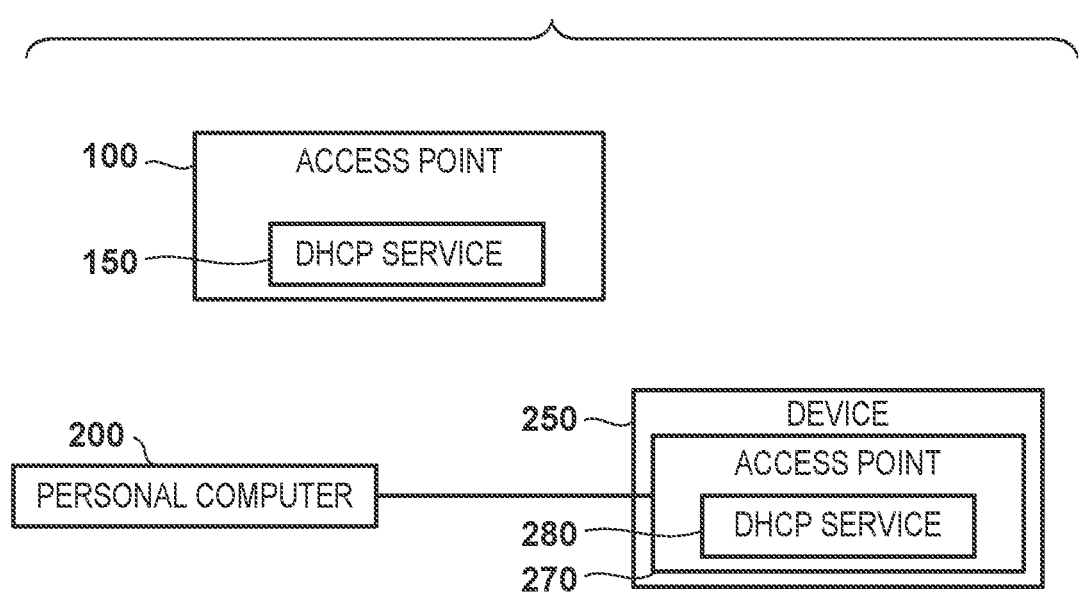

FIGS. 1A and 1B illustrate views for explaining a system configuration according to the embodiment. A system according to this embodiment includes an access point 100, a personal computer 200 as a communication apparatus, and a device 250. The access point 100 can communicate with the device 250, as follows.

FIG. 1A shows a state in which the personal computer 200 and the device 250 are wirelessly connected via the access point (to be referred to as the AP hereinafter) 100. That is, when the personal computer 200 and the device 250 are connected to a network created by the AP 100, the personal computer 200 and the device 250 are connected to each other. The AP 100 provides a DHCP service 150, and has a function of assigning a network address such as an IP address to an apparatus connected to the AP 100. In the example shown in FIG. 1A, the personal computer 200 and the device 250 are respectively assigned with IP addresses by the DHCP service 150 of the AP 100.

An example of a DHCP table of the AP 100 will now be described with reference to FIG. 4A. In the example shown in FIG. 4A, the DHCP service 150 associates the respective IP addresses of the personal computer 200 and the device 250 with each other, and stores the MAC addresses (network interface (NW IF) identifiers) of the personal computer 200 and the device 250. In No. 1 of the DHCP table of the AP 100, a MAC address "82:34::dw:12:14" of the NW IF of the personal computer 200 and an IP address "192.168.0.1" assigned to the NW IF of the personal computer 200 are saved. In No. 2, a MAC address "7a:25::e1:12:34" of the NW IF of the device 250 and an IP address "192.168.0.2" assigned to the NW IF of the device 250 are saved.

Note that this embodiment assumes that the AP 100 has the DHCP service 150. However, an apparatus having a DHCP service and connected to the AP 100 via the network may assign an IP address to each of the personal computer 200 and the device 250. In this case, the AP 100 operates as a bridge mode or extender, and thus need not perform an IP address assignment operation and need not have the DHCP service.

FIG. 1B shows a state in which the personal computer 200 and the device 250 are not connected to the AP 100. In the example shown in FIG. 1B, the personal computer 200 is directly, wirelessly connected to an AP 270 provided in the device 250. That is, when the personal computer 200 is connected to a network created by the AP 270, the personal computer 200 and the device 250 are connected to each other. When the personal computer 200 and the device 250 are directly connected, as shown in FIG. 1B, without intervention of an external access point (for example, the AP 100), this is called direct connection. The AP 270 provided in the device 250 has a function of a DHCP service 280, and has a function of assigning an IP address to the personal computer 200 connected to the AP 270. That is, in the example shown in FIG. 1B, the personal computer 200 is assigned with an IP address by the DHCP service 280 of the AP 270.

An example of a DHCP table of the AP 270 will now be described with reference to FIG. 4B. In the example shown in FIG. 4B, the DHCP service 280 stores the MAC address of the personal computer 200 assigned with the IP address. Therefore, in No. 1 of the DHCP table of the AP 270, the MAC address "82:34::dw:12:14" of the NW IF of the personal computer 200 and the IP address "172.16.0.1" assigned to the NW IF of the personal computer 200 are saved.

Figure 2A:
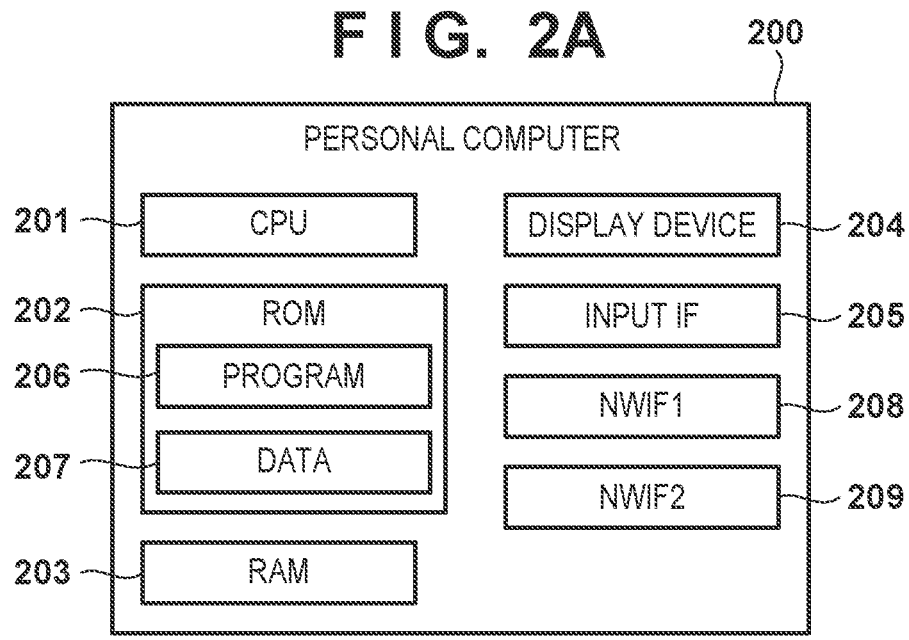
FIG. 2A is a block diagram showing the arrangement of a personal computer according to one embodiment.
Figure 2B:
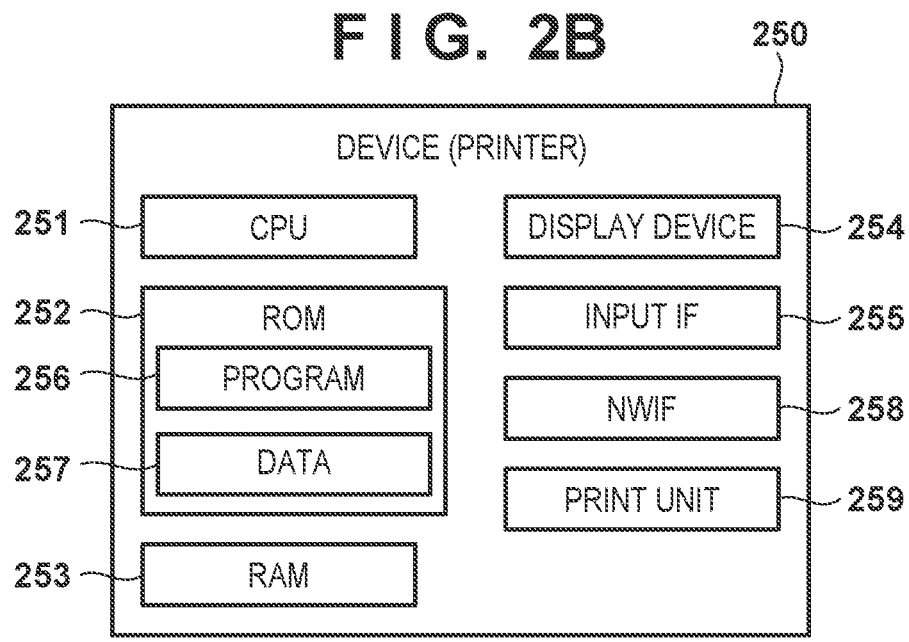
FIG. 2B is a block diagram showing the arrangement of a device according to one embodiment.

FIGS. 2A and 2B are block diagrams respectively for explaining the arrangements of the personal computer 200 and the device 250 according to this embodiment. FIG. 2A is a block diagram showing the arrangement of the personal computer 200 as a communication apparatus. The personal computer 200 includes a CPU (Central Processing Unit) 201, a ROM (Read Only Memory) 202, and a RAM (Random Access Memory) 203. The personal computer 200 also includes a display device 204, an input interface (IF) 205, a network interface 1 (NW IF 1) 208, and a network interface 2 (NW IF 2) 209. This embodiment assumes that the personal computer 200 includes two NW IFs but the personal computer 200 may include three or more NW IFs.

The ROM 202 is a storage unit that stores a program 206 and data 207. The CPU 201 reads out the program 206 from the ROM 202, deploys it in the RAM 203, and executes it. The CPU 201 can also refer to the data 207 when executing the program 206. Various commands such as network connection processing (to be described later) are described in the program 206. That is, the CPU 201 functions as a communication control unit by executing the program 206 concerning communication control. As the data 207, various tables (FIGS. 4C to 4H) (to be described later) and the like are stored.

The display device 204 is controlled by an OS, the program 206, or the like executed by the CPU 201, and is a display unit such as a display for displaying a user interface (UI). The input IF 205 is an interface to which at least one of a pointing device represented by a keyboard, a mouse, a touch panel, and a touch pad, a button, and a microphone is connected. Each of the NW IF 1 208 and the NW IF 2 209 is a network interface comprising a communication circuit including a wired communication circuit and a wireless communication circuit. This embodiment assumes that each of the NW IF 1 208 and the NW IF 2 209 is a wireless interface for transmitting/receiving a wireless signal. NW IFs 1 and 2 are set with interface identifiers such as MAC addresses (to be described later). Note that the communication apparatus according to this embodiment is not limited to the personal computer 200. For example, various information processing apparatuses such as a smartphone, a wearable device, a portable terminal, a notebook PC, a tablet terminal, a PDA (Personal Digital Assistant), and a digital camera are applicable. Furthermore, even a music reproduction device, a television, a projector, a loudspeaker, a home theater, and the like are also applicable, and any various information processing apparatuses are applicable as long as they can perform wireless communication.

FIG. 2B is a block diagram showing the arrangement of the printer 250. This embodiment will exemplify a case in which the device 250 is a printing apparatus (to be referred to as a printer hereinafter). That is, in the example shown in FIG. 1A, an arrangement is illustrated, in which the personal computer 200 can instruct, via wireless communication, network printing to the printer 250 connected to the wireless network formed by the AP 100. On the other hand, in the example shown in FIG. 1B, the personal computer 200 connected to the printer 250 by direct connection via the wireless network can instruct the printer 250 to perform network printing and wireless network setting (to be referred to as wireless setting) processing via direct connection. The printer 250 includes a CPU 251, a ROM 252, a RAM 253, a display device 254, an input IF 255, an NW IF 258, and a print unit 259. The printer 250 according to this embodiment will be described as a printer with an arrangement including one NW IF, but an arrangement including two or more NW IFs may be adopted.

The ROM 252 stores a program 256 and data 257, and the CPU 251 reads out the program 256 from the ROM 252, deploys it in the RAM 253, and executes it. The CPU 251 can also refer to the data 257 when executing the program 256. Various commands such as wireless setting processing (to be described later) are described in the program 256. As the data 257, the DHCP table described with reference to FIG. 4B and the like are stored.

The display device 254 is controlled by an OS, the program 256, or the like executed by the CPU 251, and is a display unit such as a display for displaying a user interface (UI). The input IF 255 is an interface to which at least one of a pointing device represented by a keyboard, a mouse, a touch panel, and a touch pad, a button, and a microphone is connected. The NW IF 258 is a network interface comprising a communication circuit including a wired communication circuit and a wireless communication circuit. This embodiment assumes that the NW IF 258 is a wireless NW IF for transmitting/receiving a wireless signal. The print unit 259 is a print unit that forms an image on a printing medium including a cut sheet, roll sheet, vinyl sheet, or metal. Note that in this embodiment the device 250 is a printer. However, if the device 250 is not a printer, the print unit 259 may be eliminated. The device according to this embodiment is not limited to the printer. For example, various information processing apparatuses such as a smartphone, a wearable device, a portable terminal, a notebook PC, a tablet terminal, a PDA (Personal Digital Assistant), and a digital camera are applicable. Furthermore, even a music reproduction device, a television, a wireless AP such as a Wi-Fi router, a projector, a loudspeaker, a home theater, and the like are also applicable, and any various apparatuses are applicable as long as they can perform wireless communication.

The CPU 251 of the printer 250 can cause the NW IF 258 to operate as a client (slave station) in an infrastructure mode connected to the access point (master station), as shown in FIG. 1A. In this embodiment, an operation mode in which the NW IF 258 operates as a client in the infrastructure mode will be referred to as a client mode hereinafter. In this case, the personal computer 200 can establish connection (infrastructure connection) to the device 250 via the AP 100.

The CPU 251 of the printer 250 can cause the NW IF 258 to operate as an access point (master station) that stands by for connection from an external apparatus such as the personal computer 200, as shown in FIG. 1B. In this case, the personal computer 200 can establish direct connection to the device 250 without intervention of the AP 100. In this embodiment, an operation mode in which the NW IF 258 operates as a master station that creates a network will be referred to as a master station mode hereinafter. Note that three operation modes are provided as master station modes. The first operation mode is an AP mode in which the NW IF 258 is activated as an access point that creates a network capable of accepting a print instruction from the personal computer 200. The second operation mode is a GO mode in which the NW IF 258 operates as a Wi-Fi Direct® (to be referred to as WFD hereinafter) group owner. The third operation mode is a wireless setting mode in which the NW IF 258 is temporarily activated as an access point, as will be described below. In any of the operation modes, the printer 250 operates as a master station to create a network, and the personal computer 200 is connected, as a slave station, to the network.

In order for the printer 250, that causes the NW IF 258 to operate in the client mode, to establish wireless connection to the AP 100, information (wireless profile) used for wireless setting of the AP 100 is required. For example, if, in wireless setting, a connection request is made by adding a password to the network identifier (SSID) of the AP 100, the printer 250 needs to have, as a wireless profile, information about the network identifier and password of the AP 100. The password may be acquired when the user performs an input operation via the input IF 255 of the printer 250, which requires the user to perform an input operation by checking the password. To eliminate this, the printer 250 according to this embodiment executes the wireless setting mode of causing the NW IF 258 to temporarily operate in the master station mode. Then, direct connection to an external apparatus such as the personal computer 200 is established, thereby making it possible to acquire the wireless profile such as the password of the AP 100 from the eternal apparatus. Processing (to be referred to as wireless setting processing hereinafter) in which the printer 250 sets the wireless network by receiving the wireless profile from the external apparatus will be described in detail below.

(Example of Wireless Setting Processing)

Figure 3A:
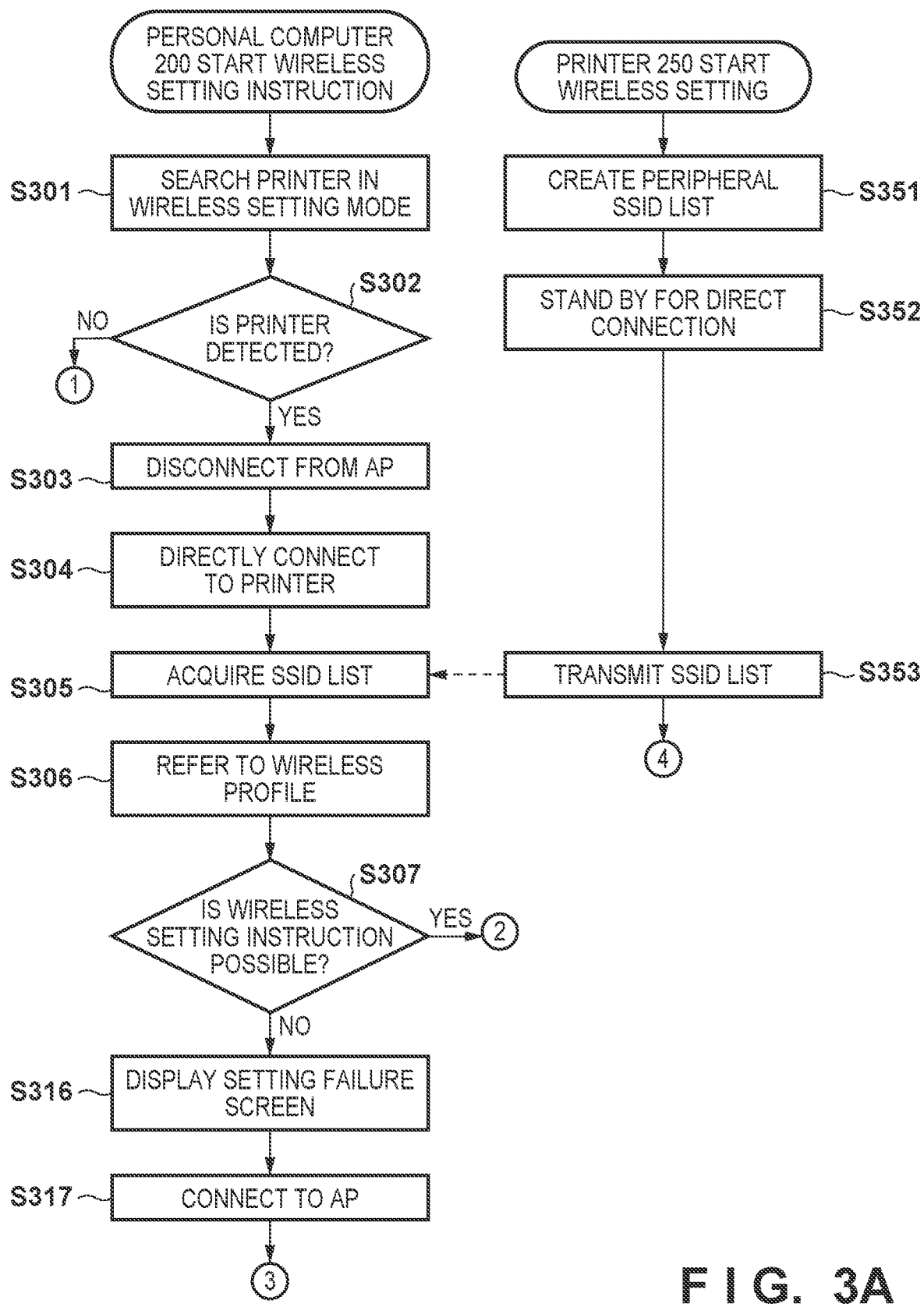
FIGS. 3A and 3B are flowcharts illustrating wireless network setting processing by temporary connection according to one embodiment.
Figure 3B:
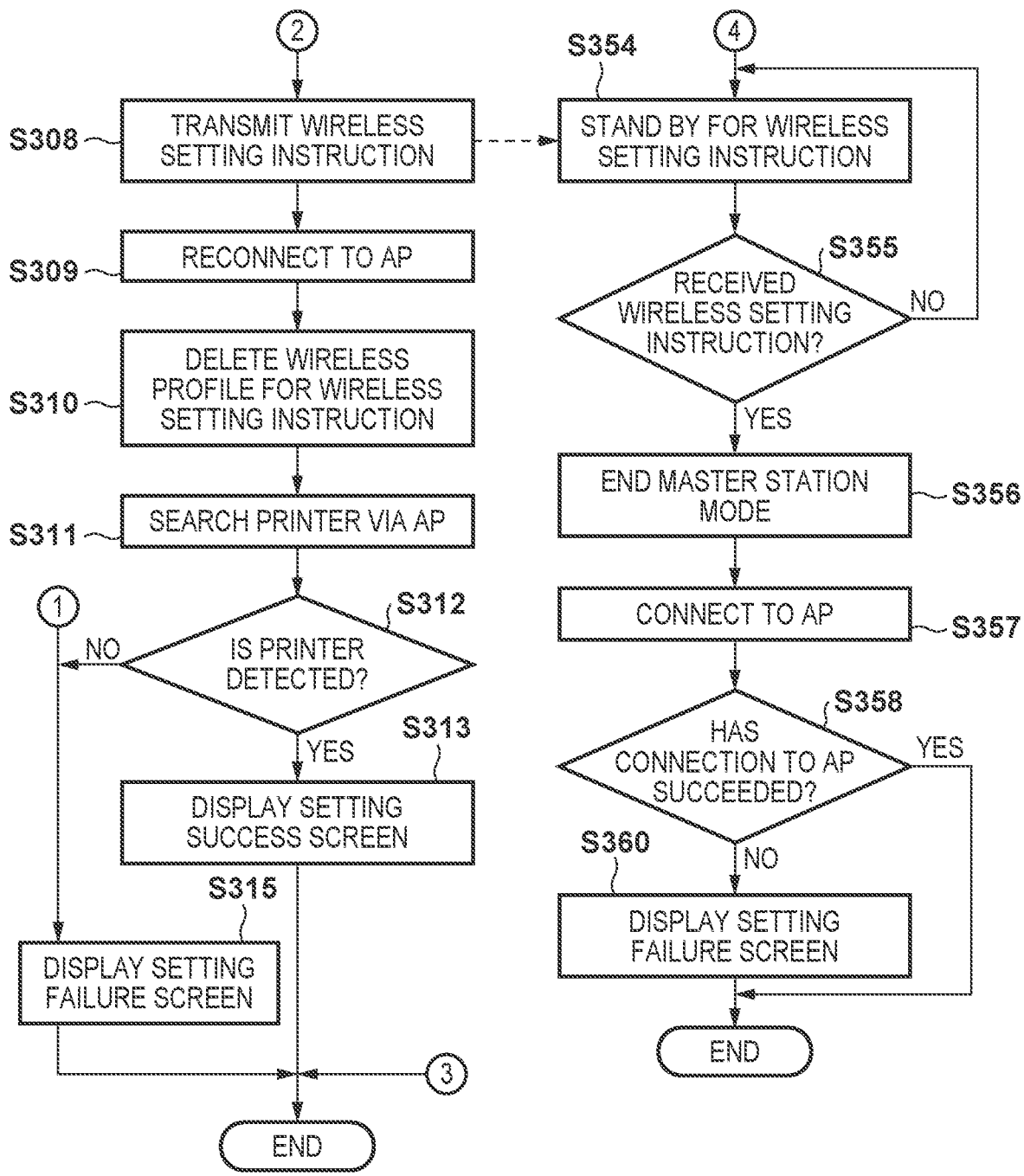

FIGS. 3A and 3B are flowcharts illustrating an example of processing in which the personal computer 200 as an external apparatus executes a wireless setting instruction to instruct execution of wireless setting processing and the printer 250 which has been instructed to execute the wireless setting processing executes the wireless setting processing. FIGS. 3A and 3B show an example of processing in which the personal computer 200 instructs the printer 250 to execute the wireless setting processing and the printer 250 executes the wireless setting processing. In FIGS. 3A and 3B, "wireless setting instruction" is implemented when the CPU 201 of the personal computer 200 executes the program 206, and "wireless setting" is implemented when the CPU 251 of the printer 250 executes the program 256.

The wireless setting instruction and wireless setting in FIGS. 3A and 3B start when the user instructs the personal computer to execute the wireless setting instruction via the input IF 205 of the personal computer 200 and instructs the printer 250 to execute wireless setting via the input IF 255 of the printer 250. Note that the personal computer 200 is already connected to the AP 100 via the wired or wireless network, and the SSID and password as the wireless profile of the AP 100 are stored as the data 207 in the ROM 202.

In this embodiment, as described above, before starting the wireless setting instruction in FIGS. 3A and 3B, the personal computer 200 is already connected to the AP 100. Therefore, as shown in FIG. 4C, the personal computer 200 has the wireless profile concerning the AP 100. FIG. 4C shows the wireless profile table of the personal computer 200 for managing the wireless profile in the table. As the first record (No=1) of FIG. 4C, information of an SSID "WIFIROUTER2G" and a password "1234-abcd" is saved as the wireless profile of the AP 100. That is, the personal computer 200 stores, as the wireless profile of the already connected AP 100, the SSID "WIFIROUTER2G" and the password "1234-abcd" in association with each other. In the example shown in FIG. 4C, no information is saved in No. 2 and subsequent numbers.

Note that the wireless profile according to this embodiment is information managed by the operating system (to be referred to as the OS hereinafter) of the personal computer 200. To access the wireless profile from a program other than the OS, such as a program for instructing the wireless setting processing and a program for executing the wireless setting processing both of which are described with reference to FIGS. 3A and 3B, an access restriction such as necessity of the administrator authority may be imposed. This embodiment assumes that the program other than the OS has the authority to delete or refer to the information saved in the wireless profile.

When the wireless setting instruction starts, the personal computer 200 searches for the printer 250 in the wireless setting mode (S301). More specifically, the personal computer 200 scans a predetermined wireless band. Upon receiving a wireless signal transmitted from the AP 270 of the printer 250, the personal computer 200 acquires an SSID for wireless setting, which is included in the received wireless signal. If a predetermined time elapses since the start of step S301, or one or more SSIDs are acquired, the personal computer 200 determines whether the SSID of the printer 250 in the wireless setting mode can be acquired (S302). Note that in the SSID of the AP 270 of the printer 250 in the wireless setting mode, a character string or a specific portion of the character string is defined in advance and fixed. This allows the personal computer 200 that executes the wireless setting instruction to automatically specify the SSID of the AP 270 of the printer 250 to which wireless setting is to be instructed.

In step S302, if the SSID of the printer 250 in the wireless setting mode cannot be acquired, the personal computer 200 cannot establish direct connection to the printer 250, and thus the process advances to step S315.

As shown in FIG. 4D, in the wireless profile table of the personal computer 200, information indicating an SSID "PRINTER2G" and open authentication as a password is saved in No. 1 as the wireless profile of the AP 270. That is, the wireless profile in No. 1 of the wireless profile table indicates that the SSID of the AP 270 connected to the personal computer 200 is "PRINTER2G" and password authentication is unnecessary (connectable without any password). In No. 2 of the wireless profile table shown in FIG. 4D, the SSID "WIFIROUTER2G" and password "1234-abcd" of the AP 100 which was connected at the start of the processing shown in FIGS. 3A and 3B and whose wireless connection was disconnected in step S303 are saved. Information may be saved in the wireless profile table from No. 1 in a connection priority order, and management may be performed to prioritize the SSID "PRINTER2G" connected last. Alternatively, information may be saved in the wireless profile table from No. 1 in descending order of connection timing, and management may be performed so that the SSID "PRINTER2G" connected last is saved in No. 1. Note that the user may be able to revert the order (No) in the wireless profile table by operating the personal computer 200 via the input IF 205.

If it is determined, in the processing of step S302, that the printer 250 in the wireless setting mode is detected (the wireless signal in which the SSID for the wireless setting processing is set is received from the AP 270), the personal computer 200 disconnects wireless connection from the AP 100 (S303). Next, the personal computer 200 performs temporary connection (temporal direct connection) to the printer 250 for the wireless setting processing, and adds the wireless profile including the SSID of the AP 270 of the printer 250 to the wireless profile table (S304). More specifically, the personal computer 200 is connected to the AP 270 via the wireless NW IF 1 208 or the wireless NW IF 2 209 using the detected wireless profile (the SSID "PRINTER2G" in the example shown in FIG. 4D).

Subsequently, the personal computer 200 issues, to the printer 250, a request of information concerning the SSID of the printer 250, and receives an SSID list as a response to the request from the printer 250 (S305). This SSID list includes a wireless profile concerning the AP obtained by the search by the printer 250, and details thereof will be described later. In step S305, the personal computer 200 also receives identification information (MAC address or the like) of the printer 250 as a response to the request from the printer 250.

Next, the personal computer 200 refers to the wireless profile table (S306), and determines whether the wireless profile of the AP 100 whose wireless connection was disconnected in step S303 is included in the SSID list acquired from the printer 250 in step S305 (S307).

If it is determined in step S307 that the SSID of the AP 100 exists in the SSID list obtained from the printer 250 (YES in step S307), the personal computer 200 instructs the printer 250 to perform connection to the AP 100 (S308). For example, a connection instruction packet including the SSID of the AP 100 is transmitted to the printer 250. On the other hand, if the SSID of the AP 100 does not exist in the SSID list obtained from the printer 250 (NO in step S307), the personal computer 200 advances the process to step S306.

Next, the personal computer 200 disconnects the direct connection from the printer 250, and performs reconnection to the AP 100 (S309). Since the wireless profile (No. 2 in the example shown in FIG. 4D) of the AP 100 is saved in the data 207, the personal computer 200 can perform reconnection to the AP 100 using the wireless profile without requiring the user to reinput the password and the like.

If there exists the wireless profile used to perform temporary direct connection in order to instruct the printer 250 to perform wireless setting, the personal computer 200 deletes the wireless profile (S310). The processing in step S310 is performed to avoid a situation in which the wireless profile used to perform direct connection to the printer 250 remains and connection to the AP 270 of the printer 250 is unwantedly performed at a timing unintended by the user. As a result of deleting the wireless profile with respect to the printer 250 in step S310, the wireless profile table of the personal computer 200 becomes a table obtained by deleting the information of the SSID of the AP 270, as shown in FIG. 4C. After that, the personal computer 200 performs reconnection to the AP 100 to search for the printer 250 by access point connection via the AP 100 (S311), and determines whether the printer 250 can be detected (S312). More specifically, in step S311, the personal computer 200 receives identification information (MAC address or the like) from a device connected to the AP 100. Then, the personal computer 200 determines whether the identification information acquired from the printer 250 in step S305 is included in the identification information acquired in step S311 (S312). If the identification information acquired from the printer 250 in step S305 is included in the identification information acquired in step S311, the personal computer 200 can determine that the printer 250 is connected to the AP 100.

If it is determined in step S312 that the printer 250 is connected to the AP 100, the personal computer 200 displays, on the display device 204, information indicating that wireless setting by the printer 250 has succeeded (S313), thereby ending the wireless setting instruction processing of the personal computer 200.

On the other hand, if it is determined in step S312 that the printer 250 is not connected to the AP 100 (NO in step S312), the personal computer 200 displays, on the display device 204, information indicating that wireless setting by the printer 250 has failed (S315), thereby ending the wireless setting instruction processing of the personal computer 200. Furthermore, if it is determined in step S307 that wireless setting in the printer 250 has failed, the personal computer 200 displays, on the display device 204, information indicating that wireless setting has failed (S316), and then performs reconnection to the AP 100 (S317), thereby ending the wireless setting instruction of the personal computer 200.

Note that the personal computer 200 according to this embodiment is assumed to include a plurality of NW IFs. Therefore, the NW IF 2 209 can be connected to the AP 270 while the NW IF 1 208 is connected to the AP 100. In this case, the processing in step S303 of disconnecting the connection from the AP 100, the processing in steps S309 and S317 of performing reconnection to the AP 100, and the processing in step S310 of deleting the wireless profile used for temporary direct connection to the printer 250 may be skipped. That is, if the personal computer 200 includes one NW IF, or can use only one NW IF, it need not perform the disconnection processing (S303), the reconnection processing (S309 and S317), and temporary profile deletion processing (S310).

Subsequently, the wireless setting processing of the printer 250 will be described. As described above, when the user performs a predetermined operation via the input IF 255 of the printer 250, the wireless setting processing of the printer 250 starts. When the wireless setting processing starts, the printer 250 makes the wireless NW IF 258 transition to the wireless setting mode to operate as the AP 270 set with the above-described SSID for wireless setting. Note that the wireless setting processing may start when the printer 250 accepts the predetermined operation of the user, as described above, or may start under another condition. As another condition, the wireless setting processing may be executed under a condition such as first power-on after purchase.

Before making the NW IF 258 transition to the wireless setting mode, the printer 250 searches for SSIDs transmitted from peripheral access points, and creates an SSID list including the detected SSIDs (S351). After that, the printer 250 makes the NW IF 258 transition to the wireless setting mode and stands by for direct connection (S352). More specifically, the NW IF 258 is made to operate as the AP 270 set with the above-described SSID for wireless setting. If, in this state, the personal computer 200 executes the processing in step S304, the printer 250 establishes direct connection in response to a connection request from the personal computer 200. Upon receiving an information request from the personal computer 200, the printer 250 transmits information including the SSID list to the personal computer 200 (S353).

Subsequently, the printer 250 stands by for a wireless setting instruction from the personal computer 200 (S354), and determines whether the wireless setting instruction is received from the personal computer 200 within a predetermined time (S355). If it is determined in step S355 that no wireless setting instruction is received, the printer 250 re-executes the processing in step S354. If it is determined in step S355 that the wireless setting instruction is received, the printer 250 ends wireless setting, and clears (initializes) the DHCP table (FIG. 4B) saved as the data 257 of the printer 250 (S356). That is, the DHCP table of the AP 270 has no information remained. Next, the printer 250 executes connection processing to the AP 100 using the SSID and password included in the wireless profile received by the wireless setting instruction of the personal computer 200 (S357). That is, the printer 250 ends the wireless setting mode, and causes the NW IF 258 to operate as a client (slave station) connected to the AP 100. Then, the printer 250 determines whether the connection processing has succeeded (S358). More specifically, in step S358, the printer 250 establishes connection to the AP 100, and determines whether the DHCP service 150 of the AP 100 normally assigns an IP address to the NW IF 258 of the printer 250. If it is determined, by the processing in step S358, that the connection processing to the AP 100 has succeeded, the printer 250 ends wireless setting. On the other hand, if it is determined that the wireless setting processing has failed, the printer 250 displays, on the display device 254, information indicating that the connection processing has failed (S360), thereby ending wireless setting.

As described above, when the personal computer 200 transmits, to the printer 250, the wireless profile of the already connected AP 100, it is possible to connect the printer 250 and the AP 100 to each other without requiring the user to input the password via the input IF 255 of the printer 250.

Dynamic IP assignment by the DHCP service will now be described. In the following dynamic IP assignment, IP assignment in the processes in steps S304 and S309 of the personal computer 200 will be described. Note that a case will be described, in which in step S304, an IP address is assigned to the personal computer 200 from the DHCP service 280 connected to the personal computer 200, and in step S309, an IP address is assigned to the personal computer 200 from the DHCP service 150. Steps S304 and S309 will collectively be described below for the sake of convenience.

After the personal computer 200 is connected to the AP 100 or 270 using the SSID of the AP 100 or 270, it broadcasts a DHCP DISCOVER message onto the network connected to the personal computer 200. Upon receiving the DHCP DISCOVER message, the DHCP service 150 or 280 includes, in a DHCP OFFER message, an IP address to be provided, and broadcasts the DHCP OFFER message to the network. For example, the DHCP services 150 and 280 provide IP addresses within the range of, for example, 172.16.0.0 to 172.32.255.255. If, upon receiving the DHCP OFFER message, the personal computer 200 accepts the provided IP address, it broadcasts, onto the network, a HDCP REQUEST message including the proposed IP address. If, upon receiving the DHCP OFFER message, the DHCP service 150 or 280 allows assignment of the IP address received together with the DHCP OFFER message, it unicasts the formal IP address by including it in a DHCP ACK message. At this time, the IP address provided by the DHCP OFFER message is managed in the DHCP table (for example, FIG. 4A or 4B) of the DHCP service 150 or 280, and provided so the same IP address is not assigned to a plurality of apparatuses.

The wireless setting mode for the wireless setting processing of the printer 250 temporarily plays the role of the AP, and ends the role of the AP when the wireless setting mode ends. Therefore, when the DHCP service 280 ends, the printer 250 clears the DHCP table (FIG. 4B). In the clear processing (S356 of FIG. 3B) of the DHCP table of the printer 250, the DHCP table (FIG. 4B) having undergone assignment is deleted. If a DHCP DISCOVER message is received again after the clear processing, the AP 270 provides, by the DHCP OFFER message, a smallest address "172.16.0.1" within the assignable address range. Note that in the AP 100 as well, if a physical reset button is pressed or a reset instruction of the DHCP table is accepted from the user who has accessed a WEB UI, the DHCP table (FIG. 4A) is cleared. As described above, the DHCP table (FIG. 4A or 4B) may be initialized.

An IF setting table (FIG. 4E or 4F) is saved as the data 207 in the personal computer 200. As shown in FIG. 4E, in the IF setting table of the personal computer 200, the MAC address "82:34::dw:12:14" of the NW IF 1 208 is registered in Index=1 and a MAC address "8a:d3::d2:56:78" of the NW IF 2 209 is registered in Index=2. An OS manages the IF setting table (FIG. 4E or 4F), and the OS operating on the personal computer 200 assigns an IF Index in order of connection as hardware (connection recognition order). That is, in FIG. 4E, the OS recognizes the NW IF 1 208 first, and recognizes the NW IF 2 209 thereafter. Then, the NW IF 1 208 of the personal computer 200 is assigned with the IP address "172.16.0.1", and this IP address is registered in Index=1 in the IF setting table (FIG. 4E). This IP address "172.16.0.1" is assigned by the DHCP service 280 of the printer 250 when performing direct connection to the printer 250 (S303 of FIG. 3A). Note that no IP address is assigned to the NW IF 2 209, and thus the IP address field of Index=2 in the IF setting table (FIG. 4E) is null. In the IF setting table shown in FIG. 4F, Index=1 and Index=2 in the IF setting table shown in FIG. 4E are exchanged.

If, in the state of the IF setting table shown in FIG. 4E, the NW IF 1 208 is physically disconnected from the personal computer 200 and then reconnected to the personal computer 200, the state of the IF setting table shown in FIG. 4F is obtained. Note that Indices of the IF setting table may similarly be exchanged by commanding detachment of hardware and plug-and-play processing in a software manner, instead of performing physical disconnection/reconnection. Furthermore, when performing reconnection to the AP 100 in step S317 of FIG. 3A, hardware ejection and plug-and-play processing may occur depending on the type of the NW IF. In this case as well, Indices may be exchanged.

In this case, if the wireless setting instruction of the personal computer 200 shown in FIGS. 3A and 3B starts again, the IP address "172.16.0.1" may be assigned to the NW IF of Index=1 when performing direct connection to the printer 250 (S304). This is because the DHCP table (FIG. 4B) of the AP 270 is cleared (S356) after the last wireless setting processing (processes in step S351 and the subsequent steps of FIGS. 3A and 3B). That is, in a state in which the personal computer 200 has the NW IF setting table shown in FIG. 4F, a DHCP OFFER message that proposes to assign the IP address "172.16.0.1" to the NW IF 2 209 of Index=1 may be received. However, since the IP address "172.16.0.1" proposed by the DHCP OFFER message is duplicate to the IP address already assigned to the NW IF 1 208 of Index=2, the OS refuses IP assignment to the NW IF 2 209. That is, the personal computer 200 cannot communicate with the printer 250 by direct connection, and the wireless setting processing fails.

Figure 5:
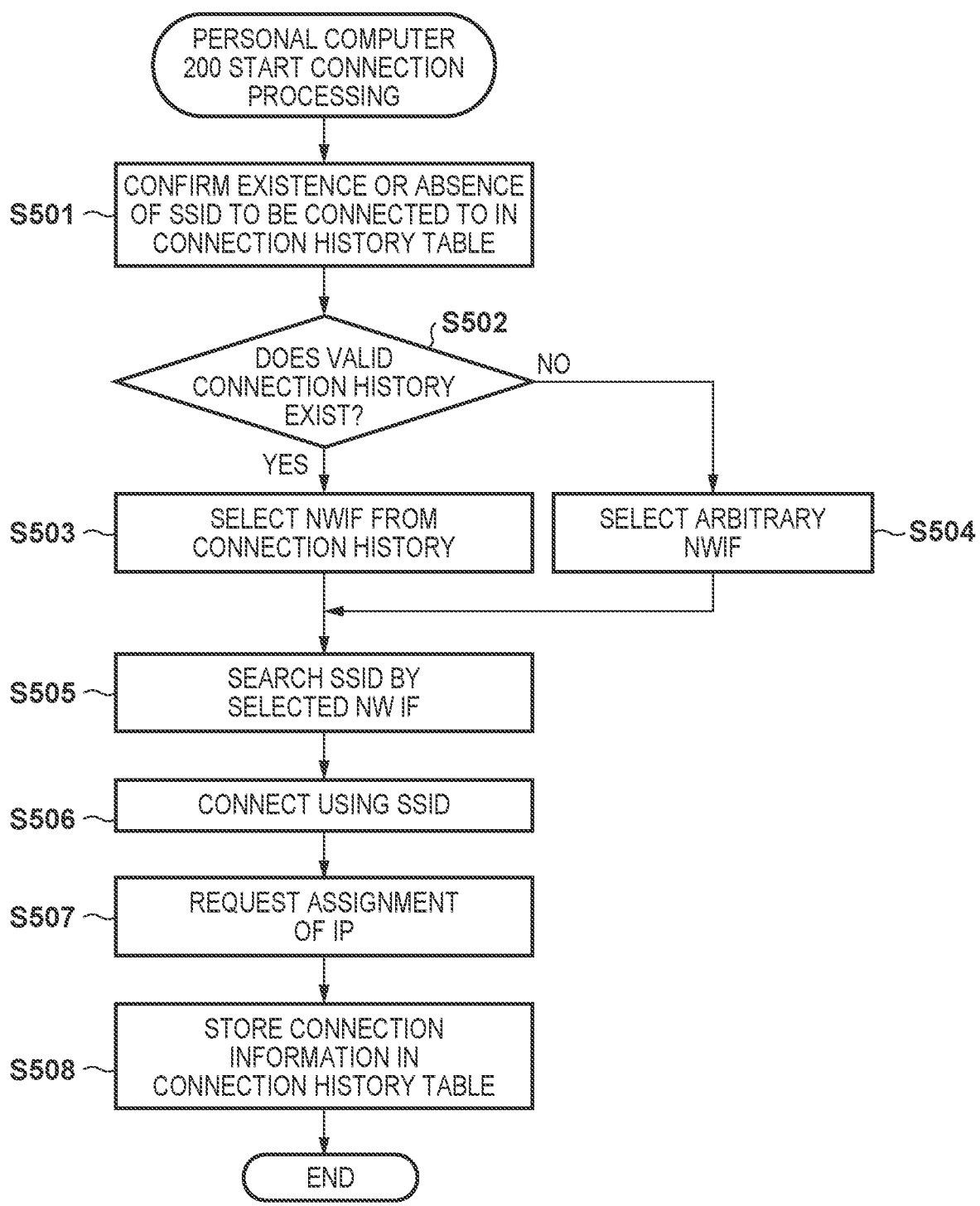
FIG. 5 is a flowchart illustrating wireless connection processing according to one embodiment.

To solve this problem, the connection processing of the personal computer 200 according to this embodiment will be described with reference to FIG. 5. The processing shown in FIG. 5 is implemented when the CPU 201 of the personal computer 200 executes the program 206 using the RAM 203 as a work space. The personal computer 200 starts the processing shown in FIG. 5 when performing the connection processing in step S304 or S309 of FIGS. 3A and 3B or the like.

When the personal computer 200 starts the connection processing shown in FIG. 5, it refers to the connection history table (FIG. 4G) to determine whether the SSID of the AP to be connected is included in the connection history table, that is, whether the SSID of the AP to be connected is an SSID to which the personal computer 200 has been connected before (S501). For example, in the connection history table shown in FIG. 4G, the SSID "PRINTER2G" of the AP 270 for the wireless setting instruction of the printer 250 is registered in No. 2 of the connection history table (FIG. 4G). In No. 2 of FIG. 4G, it can be determined that the personal computer 200 has been connected to the SSID "PRINTER2G" by the NW IF 1 208 of the MAC address "82:34::dw:12:14".

That is, if the SSID "PRINTER2G" is registered in the connection history table (FIG. 4G), it is determined that the personal computer 200 has been connected by the NW IF 1 208 in the connection processing from the personal computer 200 to the AP having the SSID "PRINTER2G". Furthermore, in No. 2 of FIG. 4G, information indicating that the IP address is valid until 17:45:07 on May 8, 20xx as a lease end day/time "20xx.5.8 17:45:07" is also registered. Note that the lease end date/time is information indicating the valid period of the IP address provided from the DHCP service 280 of the printer 250, and is designated by the DHCP service 280 at the time of provision of the IP address. If the SSID is included in the connection history table and the current time is within the valid period of the address, the personal computer 200 determines to still have the valid connection history (YES in step S502), and is connected to the SSID using the NW IF 1 208 (S503). Then, the personal computer 200 searches for the SSID "PRINTER2G" by the adopted NW IF 1 208 (S505), is connected to the SSID "PRINTER2G" (S506), and requests the DHCP service 280 to assign an IP address (S507). Subsequently, the personal computer 200 stores, in the connection history table (FIG. 4G), the SSID "PRINTER2G" connected to the MAC address "82:34::dw:12:14" of the IF used and the lease end date/time as connection information (S508). If the SSID is an already registered SSID, the personal computer 200 updates the MAC address and the lease end date/time. After that, the personal computer 200 ends the connection processing shown in FIG. 5.

On the other hand, if the SSID "PRINTER2G" is not registered in the connection history table (FIG. 4G) or the current time is not within the IP address valid period, the personal computer 200 determines to have no valid connection history (NO in step S502), and adopts an arbitrary NW IF (S504). Note that if it is determined in step S502 that the NW IF 1 208 corresponding to the MAC address "82:34::dw:12:14" is detached from the personal computer 200, the personal computer 200 determines to have no valid connection history (NO in step S502), and adopts an arbitrary NW IF (S504).

As described above, according to this embodiment, if an NW IF for which there is a valid connection history with respect to past established connection is usable, the NW IF is used. This can prevent the same IP address from being assigned to the NW IFs even if the Indices of the NW IFs are exchanged. In addition, since the time for detecting duplication and requesting an IP again after requesting the DHCP service to assign an IP address is unnecessary, it is possible to obtain the effect that the time until assignment of an IP address is normally completed is short.

Note that this embodiment has explained the example of the arrangement in which an IP assigned from the AP 270 for temporary connection of the printer 250 in the wireless setting mode state is duplicate. However, this embodiment is not limited to this. For example, even with an arrangement in which an IP address assigned from the printer 250 in the AP mode state or the GO mode state is duplicate, it is possible to obtain the effect according to this embodiment. In this case, even if the printer operates in the AP mode or the WFD GO mode, the printer 250 can operate as a master station to assign an IP using the DHCP function.

Furthermore, even with an arrangement in which an IP address assigned from a DHCP service provided by a device other than the printer 250 is duplicate, it is possible to obtain the effect according to this embodiment.

Second Embodiment

The second embodiment will be described next. In this embodiment, in the case of temporary connection, an IP address is deleted from an IF setting table (FIG. 4E or 4F) in a personal computer 200. This prevents duplication of an IP address at the time of reconnection. Note that a description of the same arrangement and processing as those in the first embodiment will not be repeated and an arrangement and processing different from the first embodiment will mainly be described.

Figure 6:
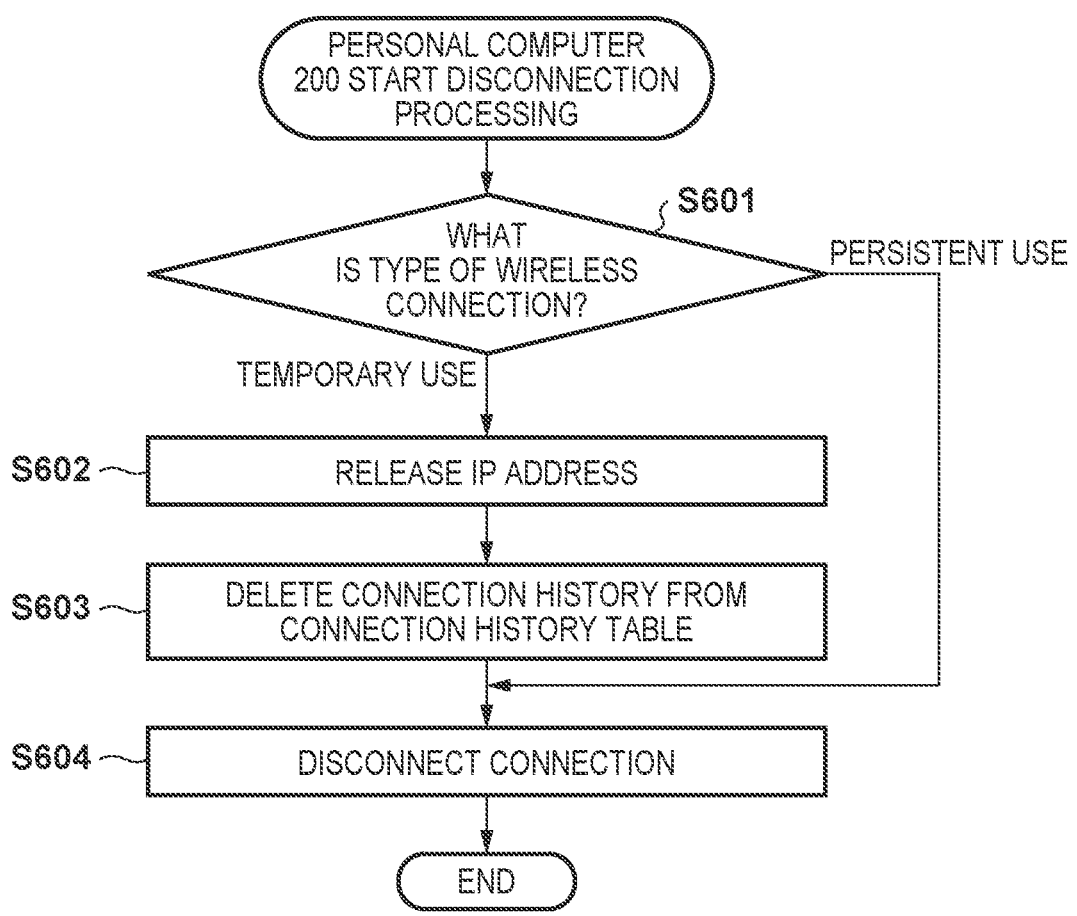
FIG. 6 is a flowchart illustrating connection disconnection processing according to one embodiment.

Disconnection processing (connection disconnection processing) of wireless connection according to this embodiment will be described with reference to FIG. 6. The connection disconnection processing of the personal computer 200 starts when communication with the connected AP ends and processing (S303 or S309 of FIGS. 3A and 3B) of disconnecting the connection is performed. When starting the connection disconnection processing, the personal computer 200 discriminates the type of a wireless network to which it has been wirelessly connected (S601). The type of wireless connection includes an application of persistent use for printing or the like and an application of temporary use for wireless setting or the like, and the personal computer 200 discriminates between the two types of applications as the types of wireless connection (S601). For example, if an SSID includes a specific character string (for example, "CLS" or "SETUP"), the personal computer 200 determines temporary wireless connection; otherwise, the personal computer 200 determines an AP for persistent use. For an AP for temporary wireless connection, a DHCP function may be reset, that is, a DHCP table may be reset upon completion of connection. In this case, for example, when a printer 250 re-executes the function of an AP 270, the same IP address is assigned to the personal computer 200 at a high possibility. On the other hand, for the AP for persistent use, the possibility that the DHCP table is reset within a predetermined period is lower than that for temporary wireless connection, that is, the possibility of assigning the same IP address may be lower than that for the AP for temporary wireless connection. Therefore, for wireless connection to the AP for persistent use, even if the personal computer 200 performs disconnection processing of an NW IF 1 208 (S604), the processing ends directly. On the other hand, for connection to the AP for temporary wireless connection, the personal computer 200 releases, before disconnecting the connection, the IP address assigned to the NW IF 1 208 (S602). In this release processing, an OS transmits a DHCP RELEASE signal for deleting the IP address assigned to the NW IF 1 208 from the IF setting table (FIG. 4E) of the personal computer 200. After that, the personal computer 200 deletes connection history information No. 1 (SSID, MAC address, and connection end date/time) of the NW IF 1 208 from the connection history table (FIG. 4G) (S603). Subsequently, the personal computer 200 performs disconnection processing of the NW IF 1 208 (S604), and ends the processing.

The release processing of the processing in step S602 sets the IP address of the NW IF 1 208 in an unassigned state. Thus, even if the Indices of the NW IF 1 208 and an NW IF 2 209 are exchanged after that, as shown in FIG. 4F, an IP address "172.16.0.1" of Index=2 is unassigned, which is indicated by "–". Therefore, even if the DHCP table of the AP 270 of the printer 250 is reset, duplication assignment of the IP address does not occur even by assigning the IP address "172.16.0.1" to Index=1 at the time of direct connection in step S304. Thus, the personal computer 200 can request the IP address assigned to Index=1 by a DHCP request, thereby continuing the network connection processing (S305).

Note that in this embodiment, IP release processing is performed before the connection disconnection processing only in the case of wireless connection for temporary connection for wireless setting or the like. In the case of wireless connection for persistent use for printing or the like, no IP release processing (S602) is executed. This is because if the IP release processing in step S602 is performed, it is necessary to request an IP address of the DHCP server again at the time of next connection, and wireless connection to the printer 250 cannot be established until assignment of the IP address is completed, thereby taking time to set a printable state. As described above, since the possibility that the DHCP table is cleared for the AP for persistent connection is lower than that for the AP for temporary connection, the same IP address is assigned at a low possibility. Therefore, reconnection can quickly be performed by not releasing the IP address in the case of wireless connection for persistent connection.

Third Embodiment

Figure 7:
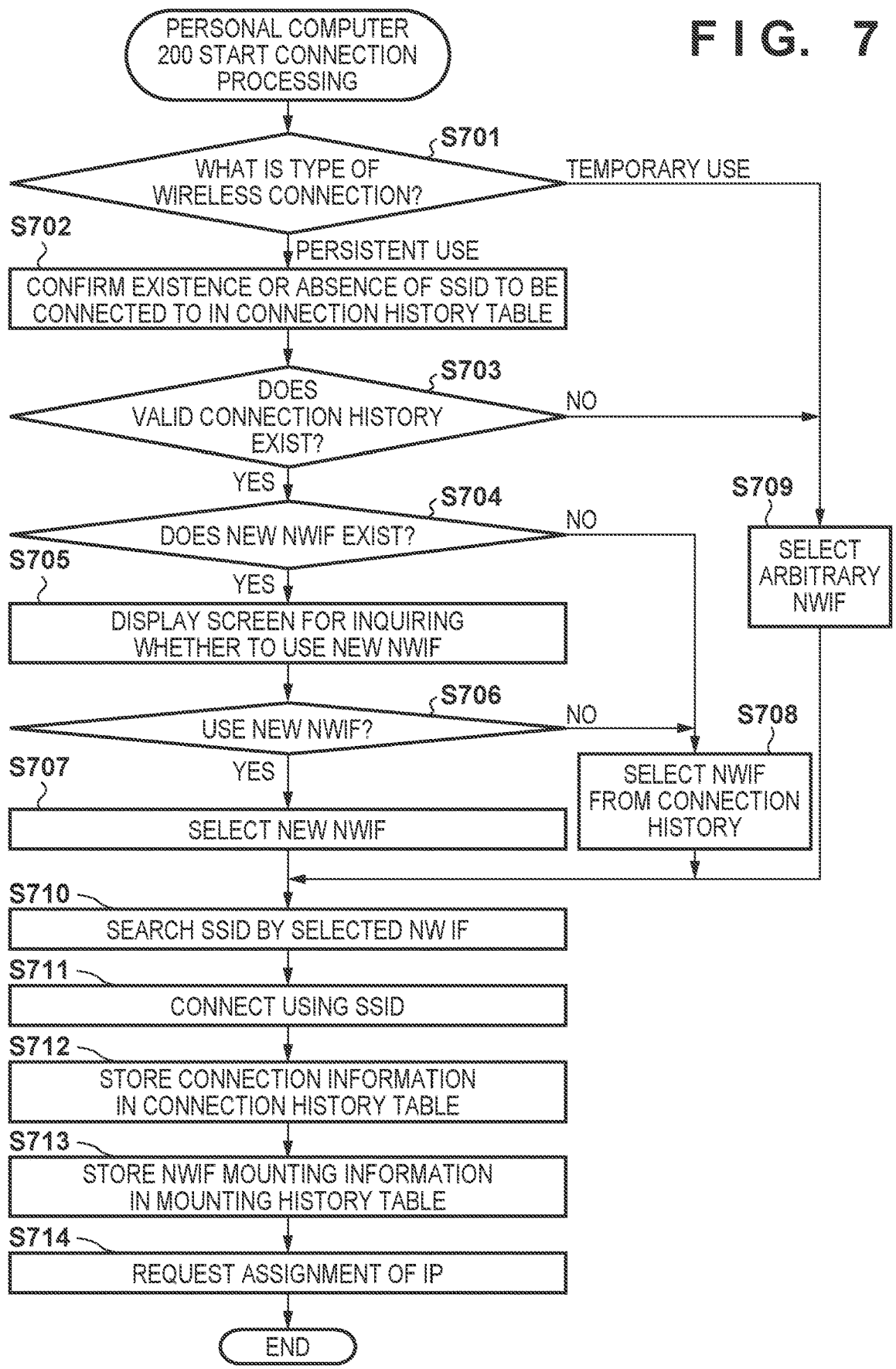
FIG. 7 is a flowchart illustrating wireless connection processing according to one embodiment.

The second embodiment has explained the processing of preventing the same IP address from being assigned to the NW IF for the application of temporary connection for wireless setting or the like. In the third embodiment, connection processing of a personal computer 200 performed in addition to the disconnection processing (S600 to S605) of the second embodiment so as to cope with network connection for an application of persistent connection will be described with reference to FIG. 7. Note that a description of the same processing, arrangement, and function as those in the first or second embodiment will not be repeated. The processing shown in FIG. 7 is implemented when a CPU 201 of the personal computer 200 executes a program 206 using a RAM 203 as a work space. The personal computer 200 starts the processing shown in FIG. 7 when performing the connection processing in step S304 or S309 of FIGS. 3A and 3B.

When the personal computer 200 starts network connection processing, it determines whether wireless connection is temporary connection or persistent connection (S701). If the type of wireless connection is temporary connection for wireless connection, the personal computer 200 adopts an arbitrary NW IF (S709), executes an SSID search using the adopted NW IF (S710), and is connected to a target SSID (S711). Subsequently, the personal computer 200 stores connection information (SSID, MAC address, and connection end date/time) in a connection history table (FIG. 4G) (S712). After that, the personal computer 200 stores IF mounting information (MAC address) in an IF mounting history table (FIG. 4H) (S713), requests an IP address of a DHCP service (150 or 280) by DHCP (S714), and ends the processing. Note that in the third embodiment, disconnection processing described with reference to FIG. 6 is executed at the time of disconnection. In the disconnection processing, if the type of wireless connection is temporary connection for wireless setting, the IP address has been released (S602), and thus duplication of an IP address never occurs by adopting any NW IF.

On the other hand, if it is determined in the determination processing (S701) that the type of wireless connection is for an application of persistent use for printing or the like, the personal computer 200 refers to the connection history table (FIG. 4G) to search for an SSID to be connected (S702). The personal computer 200 determines whether the SSID to be connected is registered in the connection history table (FIG. 4G) (S703). If the SSID is not registered, the personal computer 200 adopts an arbitrary IF (S709), and then performs the processes in step S710 to S715, as described above as the description of this embodiment.

If the SSID is registered in the connection history table (FIG. 4G) (YES in step S703), the personal computer 200 refers to the NW IF mounting history table shown in FIG. 4H to determine whether there exists an NW IF newly added after the last wireless connection (S704). If there is no newly added NW IF, the personal computer 200 adopts the NW IF used before, in accordance with the information in the connection history table (FIG. 4G) (S708). After that, as described above as the description of this embodiment, the processes in steps S710 to S715 are performed. The use of the NW IF used before makes it possible to communicate with a printer 250 without requiring reassignment of an IP address.

On the other hand, if it is determined in step S704 that there exists the new NW IF (YES in step S704), the personal computer 200 displays, on a display device 204, a screen for inquiring whether to use the new NW IF (S705), and the user determines a result of selection by an input IF 205 (S706). If the user selects, in step S706, not to use the new NW IF (NO in step S706), the personal computer 200 adopts an NW IF which has a history of being used for connection, with reference to FIG. 4G (S708). After that, as described above as the description of this embodiment, the processes in steps S710 to S715 are performed. If the user selects, in step S706, to use the newly added NW IF (YES in step S706), the personal computer 200 adopts the newly added NW IF (S707), and then performs the processes in steps S710 to S715, as described above as the description of this embodiment.

A case in which it is desirable to adopt a new NW IF includes, for example, a case in which the user purchases an NW IF with a high communication speed and mounts it. However, the IP address remains in the NW IF used before for connection, and thus there is the risk of duplication of the IP address. Therefore, in step S707, the personal computer 200 executes the processing of releasing the IP address of the NW IF used before for connection, and advances to the processes in step S710 and the subsequent steps.

As described above, according to this embodiment, even in the case of the application of persistent use for printing or the like, it is possible to solve the problem that the same IP address is assigned to disable communication. A case in which time is required to release an IP address which is assigned in a duplication manner at a high possibility can be limited to a case in which it is desirable to use a new NW IF.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-094904, filed May 29, 2020, which is hereby incorporated by reference herein in its entirety.

What is claimed is:

1. A communication apparatus comprising:
   a plurality of wireless interfaces;
   a storage unit configured to store, for a past established connection, connection history information associating a network identifier with an interface identifier of one of the plurality of wireless interfaces; and
   a communication control unit configured to select, based on the connection history information, one of the plurality of wireless interfaces, and transmit a connection request to another apparatus using the selected wireless interface,
   wherein the communication control unit
   determines whether the network identifier of the other connectable apparatus is a network identifier for connection for temporary communication,
   determines, in a case where the connection history information corresponding to the network identifier of the other apparatus is stored in the storage unit and the network identifier is not the network identifier for connection for temporary communication, whether a new wireless interface which has not been mounted on the communication apparatus corresponding to the connection history information is mounted, and
   displays, in a case where the new wireless interface is mounted, a screen for inquiring whether to perform connection using the new wireless interface.

2. The apparatus according to claim 1, wherein in a case where valid connection history information including the network identifier of the other apparatus is not stored in the storage unit, the storage unit stores the connection history information associating the network identifier with the interface identifier of the wireless interface used to transmit the connection request.

3. The apparatus according to claim 1, wherein the storage unit stores the connection history information further associating a valid period of an assigned network address with respect to the past established connection.

4. The apparatus according to claim 3, wherein in a case where the connection history information corresponding to the acquired network identifier is stored in the storage unit, and the valid period of the network address of the connection history information has not expired, the communication control unit determines that the connection history information is valid.

5. The apparatus according to claim 3, wherein in a case where the connection history information corresponding to the network identifier is stored in the storage unit, the storage unit updates the valid period.

6. The apparatus according to claim 1, wherein the network identifier is a service set identifier (SSID).

7. The apparatus according to claim 1, wherein the interface identifier of the wireless interface is a Media Access Control (MAC) address of the wireless interface.

8. The apparatus according to claim 1, wherein the communication control unit transmits, based on valid connection history information including a network identifier of another apparatus to which connection is to be established, being stored in the storage unit, the connection request to the other apparatus using a wireless interface, which has connected to the network identifier, from among the plurality of wireless interfaces.

9. The apparatus according to claim 1, wherein the communication control unit transmits, based on valid connection history information including a network identifier of another apparatus to which connection is to be established, being stored in the storage unit, the connection request to the other apparatus using the wireless interface corresponding to the network identifier in the connection history information, from among the plurality of wireless interfaces, and transmits, based on the valid connection history information including the network identifier of the other apparatus, not being stored in the storage unit, the connection request to the other apparatus using one of the plurality of wireless interfaces.

10. A communication control method executed by a communication apparatus including a plurality of wireless interfaces, and a storage unit configured to store, for a past established connection, connection history information associating a network identifier with an interface identifier of one of the plurality of wireless interfaces, the method comprising:

selecting, based on the connection history information, one of the plurality of wireless interfaces, and transmitting a connection request to another apparatus using the selected wireless interface;

determining whether the network identifier of the other connectable apparatus is a network identifier for connection for temporary communication;

determining, in a case where the connection history information corresponding to the network identifier of the other apparatus is stored in the storage unit and the network identifier is not the network identifier for connection for temporary communication, whether a new wireless interface which has not been mounted on the communication apparatus corresponding to the connection history information is mounted; and displaying, in a case where the new wireless interface is mounted, a screen for inquiring whether to perform connection using the new wireless interface.

* * * * *